W. O. HANCOCK.
GEARING.
APPLICATION FILED NOV. 30, 1909.
970,328.
Patented Sept. 13, 1910.
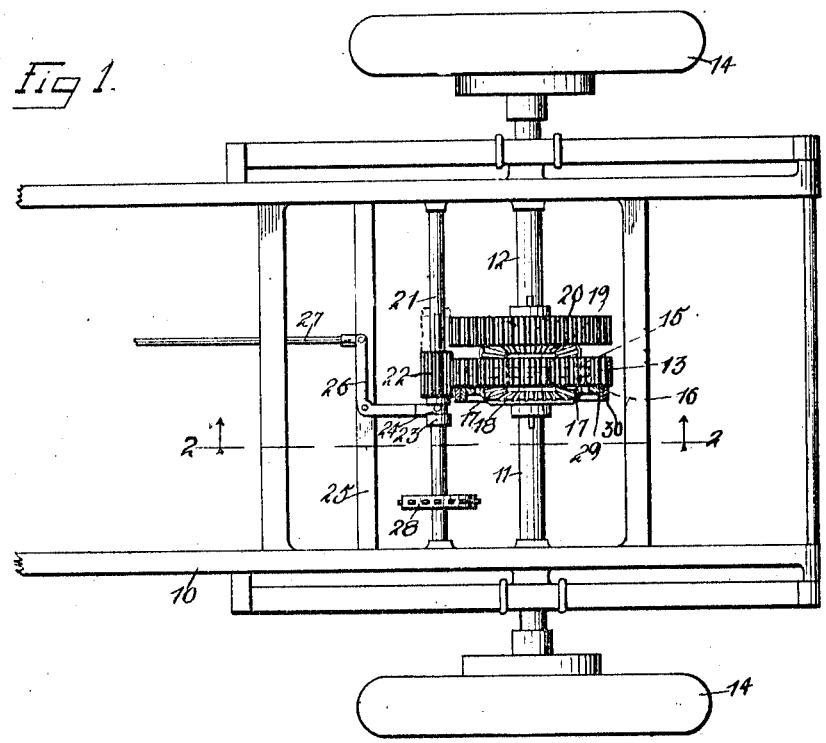
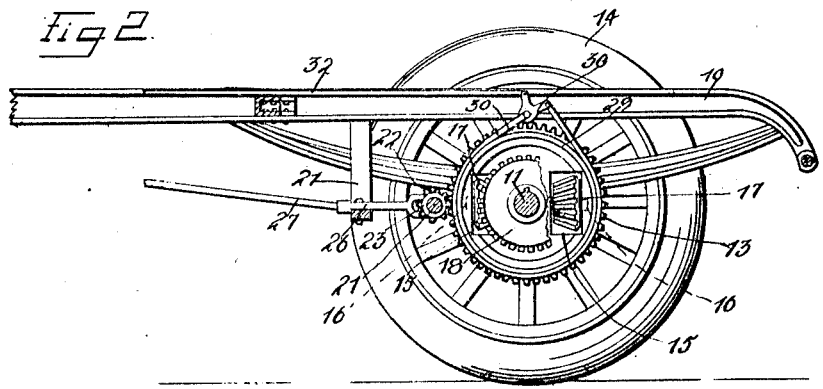
Inventor
WILLIAM O. HANCOCK.
Witnesses
J. E. Strobel.
L. N. Gillis
By Chandler & Chandler
Attorneys

UNITED STATES PATENT OFFICE.

WILLIAM O. HANCOCK, OF ORLEANS, INDIANA.

GEARING.

970,328.   Specification of Letters Patent.   Patented Sept. 13, 1910.

Application filed November 30, 1909. Serial No. 530,699.

*To all whom it may concern:*

Be it known that I, WILLIAM O. HANCOCK, a citizen of the United States, residing at Orleans, in the county of Orange, State of Indiana, have invented certain new and useful Improvements in Gearing; and I do hereby declare the following to be a full, clear, and exact description of the invention, such as will enable others skilled in the art to which it appertains to make and use the same.

This invention relates to transmission gearing and has special reference to that form of transmission gearing which is commonly used on automobiles, traction engines and the like.

One object of the invention is to provide an improved means whereby one of the driving wheels of a motor car may be permitted to rotate in one direction while the other wheel is rotated in the opposite direction.

Another object of the invention is to provide an improved means whereby both wheels may be rotated in unison in the same direction.

It is well understood that in this class of devices it is usual to employ what is commonly termed a differential train. It is also understood that almost all motor vehicles have their driving wheels on separate sections of the axle so that the wheels may be rotated independently of each other. Furthermore, these sections are usually actuated by a differential train so that where the load or resistance to movement of both wheels is equal the differential train will operate to rotate both at the same speed, while where the resistance is greater on one than on the other, as in going around corners, one of the wheels will be allowed to rotate at a different rate of speed from the other. It is practically essential that the wheels should be mounted in this manner but difficulty is experienced when one of the wheels strikes a slippery spot while the other wheel is on solid ground as the tendency is for the machine to stand still since the wheel on the slippery ground simply rotates without driving the machine forward while the other wheel does not move. By means of the provision set forth in the second object of the invention this difficulty is eliminated as both wheels can be locked together to positively move in unison.

With the above and other objects in view, as will be hereinafter apparent, the invention consists in general of a differential train including a driving gear and a driven gear and means to drive either or both of said gears.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a view of the rear portion of an automobile chassis with this invention applied thereto, all gear casings being left off the better to show the working parts, and the band brake used with this invention being in section for the same reason. Fig. 2 is a section on the line 2—2 of Fig. 1.

The numeral 10 indicates the chassis of an automobile and on this chassis are carried in suitable bearings rear axle sections 11 and 12. These sections have their inner ends in juxtaposition and on these inner ends is mounted a freely rotatable gear 13. On the outer ends of these sections are mounted the usual driving wheels 14.

The gear 13 is provided with one or more openings therethrough as indicated at 15 and shafts 16 are held in these openings. On these shafts 16 are mounted idler pinions 17. Upon the end of the axle 11 in such position as to mesh with the pinions 17 is a driven gear 18 while in similar position on the axle section 12 is a similar bevel gear 19 likewise meshing with the pinions 17. Secured to the bevel gear 19 is a gear 20 preferably termed the mate for the driving gear and of the same diameter and pitch as the driving gear 13.

Mounted in suitable bearings on the chassis is a shaft 21 whereon is splined a gear 22 provided with a collar 23 having a groove 24 therearound. Secured to the chassis is a bracket 25 which has pivoted thereto a bell crank shipper lever 26 one arm of which is forked to engage in the groove 24 while the other arm is connected to a rod 27 running to the operating lever at the front of the machine, this lever not being deemed necessary here to be shown as it is of the ordinary type and forms no essential part of this invention. The gear 22 is of sufficient length so that it may engage both the gear 13 and the gear 20 at the same time when properly positioned and the shipper lever 26 is so proportioned that the gear 22 may be moved to engage either the gear 13 or the gear 20 individually or to engage the two gears 13 and 20 collectively.

In order to operate the shaft 21 suitable means is provided such as a sprocket 28 which is secured to the shaft and which is connected by means of the ordinary sprocket chain to the engine or motor. This driving means is merely typical of any suitable means to rotate the shaft 21 and it will be understood that any other mechanism can be used in place thereof.

Secured to the gear 13 is an annular hub 29 surrounding which is a band brake 30 of the usual construction and this band brake is actuated by a lever 31 having a rod 32 extending therefrom to the forward portion of the car, this rod being provided with the usual latch lever or other suitable means for actuating the same not deemed necessary here to be shown.

In the operation of this device when the car is traveling over the ordinary road and in a straight line or substantially so, the gear 22 is positioned so as to engage with the gear 13 and to be out of engagement with the gear 20. When in this position the differential acts in the usual manner common to these devices. If it is desired to turn a very sharp corner the gear 22 is shifted so as to engage the gear 20 and be out of engagement with the gear 13. At the same time the band brake is applied and the gear 13 prevented from rotating. Now, if it be desired to turn to the left the gear 22 is rotated in such direction as would cause the car to move forward. This will rotate the gear 20 in a forward direction while the gear 18, through the action of the gears 19 and 17, will be caused to rotate at an equal speed in a backward direction. In this manner if the steering wheels are properly positioned the car may be turned in its own length. If it be desired to turn to the right the motion of the gear 22 is reversed so that the gear 20 will be run backward and the gear 18 forward.

If a slippery place is struck while passing over the road and the machine becomes stalled by reason of one of the shafts rotating while the other stands still, the gear 22 is moved to engage both the gear 13 and the gear 20 and by this means the two shaft sections 11 and 12 are caused to rotate together as the pinions 17 will be held from rotation on their shafts, the gears 13 and 20 thus rotating in unison. It will thus be seen that this device may be used either to rotate one wheel in one direction and the other in the opposite direction, to actuate both wheels in the manner common with differential gearing, or to positively lock both sections of the axle together so as to cause both wheels to positively rotate in unison.

There has thus been provided a simple and efficient device of the kind described and for the purpose specified.

Having thus described the invention, what is claimed as new, is:—

1. In a device of the kind described, a differential train including a driving gear and a driven gear, and means to drive either or both of said gears.

2. In a device of the kind described, a differential train including a driving gear, a pair of driven gears, and an idler meshing with the driven gears; in combination with means to hold the driving gear from rotating, and other means to drive the remainder of the train when the driving gear is so held.

3. In a device of the kind described, a differential train including a driving gear, a pair of driven gears, and an idler meshing with the driven gears; in combination with means to hold the driving gear from rotating, and other means to drive the remainder of the train when the driving gear is so held, said other means being adapted to drive the driving gear when not so held.

4. In a device of the kind described, a differential train including a driving gear, a pair of driven gears, and an idler meshing with the driven gears; in combination with means to hold the driving gear from rotating, and other means to drive the remainder of the train when the driving gear is so held, said other means being adapted to drive the driving gear when not so held and being further adapted to drive both the driving and driven gears in unison.

5. In a device of the kind described, a two-part axle, a driving gear freely rotatable thereon, pinions carried by said driving gear, a gear on one part of said axle meshing with said pinions, a second gear on the other part of the axle also meshing with the pinions, said pinions and other meshing gears being beveled, a second gear of equal dimensions to the driving gear and secured to one of the bevel gears, a driving shaft, a gear splined to said shaft and adapted to mesh with the driving gear and its mate, and means to move the last mentioned gear on the driving shaft to cause the same to mesh with the driving gear, with its mate, or with both the driving gear and its mate.

6. In a device of the kind described, a two-part axle, a driving gear freely rotatable thereon, pinions carried by said driving gear, a gear on one part of said axle meshing with said pinions, a second gear on the other part of the axle also meshing with the pinions, said pinions and other meshing gears being beveled, a second gear of equal dimensions to the driving gear and secured to one of the bevel gears, a driving shaft, a gear splined to said shaft and adapted to mesh with the driving gear and its mate, means to move the last mentiond gear on the driving shaft to cause the same to mesh with the driving gear, with its mate, or with both the driving gear and its mate, a brake arranged to hold said driving gear from rotation when the gear on the driving shaft is in mesh with the mate of the driving gear.

In testimony whereof, I affix my signature, in presence of two witnesses.

WILLIAM O. HANCOCK.

Witnesses:
SHERMAN SUMNER,
THOMAS J. SHEPHERD.